Oct. 24, 1967        A. F. GAGE        3,348,641

BRAKE SHOE LINING WITH INCORPORATED HEATING ELEMENT

Filed Jan. 10, 1966        4 Sheets-Sheet 1

INVENTOR

ARTHUR F. GAGE

BY Strauch, Nolan, Neale, Nies & Bronaugh

ATTORNEYS

Oct. 24, 1967  A. F. GAGE  3,348,641
BRAKE SHOE LINING WITH INCORPORATED HEATING ELEMENT
Filed Jan. 10, 1966  4 Sheets-Sheet 2

INVENTOR
ARTHUR F. GAGE

BY
Strauch Nolan, Neale,
Nies & Bronaugh
ATTORNEYS

Oct. 24, 1967         A. F. GAGE         3,348,641
BRAKE SHOE LINING WITH INCORPORATED HEATING ELEMENT
Filed Jan. 10, 1966                4 Sheets-Sheet 3

INVENTOR
ARTHUR F. GAGE

BY Strauch, Nolan, Neale,
Nies & Bronaugh
ATTORNEYS

Oct. 24, 1967 A. F. GAGE 3,348,641
BRAKE SHOE LINING WITH INCORPORATED HEATING ELEMENT
Filed Jan. 10, 1966 4 Sheets-Sheet 4

INVENTOR
ARTHUR F. GAGE

BY Strauch, Nolan, Neale,
Nies & Bronaugh
ATTORNEYS

United States Patent Office 3,348,641
Patented Oct. 24, 1967

3,348,641
BRAKE SHOE LINING WITH INCORPORATED HEATING ELEMENT
Arthur F. Gage, Detroit, Mich., assignor to Rockwell-Standard Corporation, Pittsburgh, Pa., a corporation of Delaware
Filed Jan. 10, 1966, Ser. No. 519,714
18 Claims. (Cl. 188—250)

ABSTRACT OF THE DISCLOSURE

A brake shoe and composite brake shoe lining bonded to said brake shoe by a heat setting adhesive, said composite brake shoe lining comprising an outer member of friction material molded to a separate preformed thin solid back-up member of different material providing an internal recess between said members, and electrical resistance elements mounted in the recess between said friction member and said back-up member for electrically heating said heat setting adhesive.

---

The present invention refers to vehicle brake shoes and more particularly to a special brake lining having an electrical resistance wire heating element incorporated therein.

Brake shoes in such brake assemblies consist in general of a web to which is secured a flat curved platform that carries a friction member in the form of a lining of suitable friction material.

Conventionally the friction lining is attached to the brake shoe platform by rivets or like mechanical fastening means. The disadvantage of this arrangement is that the full thickness of the lining cannot be used since, when the lining is worn down to the rivet heads, the lining has to be replaced, even though there may still be a considerable amount of friction material remaining which must be discarded. The relining of conventional rivetted brake shoes is often difficult and tedious since the rivets have to be removed, which is not always easy because during normal braking the rivets may have become seized in their respective holes.

It had been proposed to attach the brake lining to the shoes by some other means such as by the adhesive bonding method disclosed in U.S. Letters Patent No. 2,520,978, issued to R. K. Super. These prior bonding methods required intricate relatively expensive induction heating apparatus, and a disadvantage in these earlier bonding methods was that heat from the induction coil had to be directed through the relatively non-conductive thick brake shoe lining material to heat the adhesive, this requiring high frequency current at a power output far in excess of that actually needed to bring the bonding adhesive to its curing temperature. Also, some current is transferred to the conductive metal brake shoe, unnecessarily heating the shoe which may have an adverse effect on the metal structure of the shoe.

In the co-pending application of James C. Cumming et al. Ser. No. 407,303, filed Oct. 29, 1964, a novel method is disclosed for bonding brake linings to brake shoe platforms by heat setting adhesives. This essentially consists of applying electrical heat directly at the adhesive interface to locally heat the adhesive without transferring the heat through the lining and without any great amount of heat being dissipated in the brake shoe. This is accomplished by placing a heating wire or film resistance conductor between the adhesive and the bond surface of either one of the members to be bonded together. Since the heating conductor remains in place after the bonding operation it can conveniently be used for debonding when the lining is sufficiently worn to be replaced, by heating the adhesive to its rupture temperature.

The present invention constitutes an improvement over the bonding method and apparatus disclosed and claimed in said Ser. No. 407.303.

The primary object of the present invention is the provision of a novel method and apparatus for securing a resistance element to a member which is to be adhesively bonded to another member in such way as to assure a fast and even heat distribution across the entire bonding surface of the members.

A further object of the invention resides in the provision of a novel composite member comprising a back-up member of molded compressed material and a member of friction material integrally fused to each other with a resistance wire between them.

A further object of the present invention is to provide a composite brake shoe lining having a back-up member of compressed material on one side of which is permanently attached a resistance wire for electrically heating an adhesive applied to the other side of the back-up member.

Still another object of the invention is the provision of a brake shoe for an internally expanding brake in which the lining is bonded to the metal platform of the brake shoe by a heat-setting adhesive electrically heated by resistance wire permanently embedded in the lining near its lower surface thereof.

A still further object is to provide a novel method of bonding friction brake linings to metal brake shoes by means of a heat setting adhesive which is electrically heated to its curing temperature by electrical resistance wires permanently embedded in the lining near the bond surface and available terminals for passing current through those wires.

Other novel objects and features will become apparent from the following detailed description in connection with the appended drawings where in:

Figure 1:
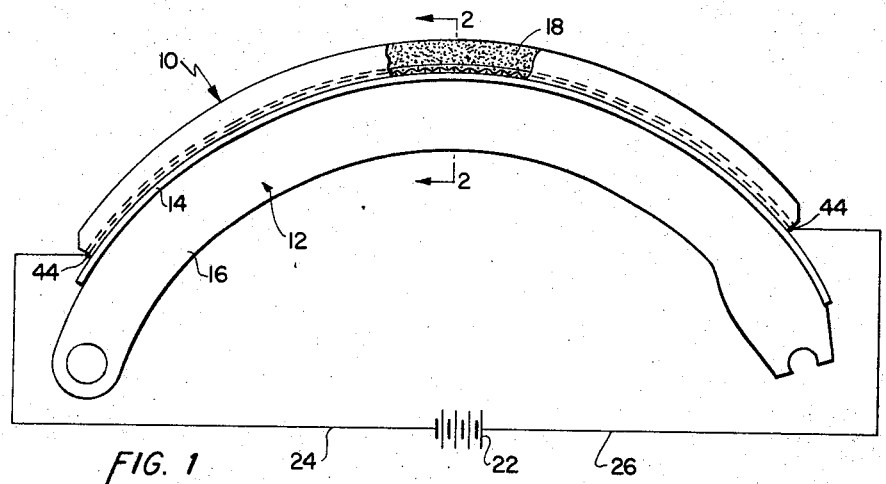
FIGURE 1 is an elevation partially broken away and in section showing a brake shoe and lining assembly according to a preferred embodiment of the invention.

FIGURE 1 shows a brake shoe and lining assembly 10 comprising a metal brake shoe 12 consisting essentially of an arcuate platform 14 attached as by welding at 15 to a centrally disposed longitudinal web 16.

Brake shoe supporting platform 14 carries a friction lining 18 bonded thereto by a heat-setting adhesive layer 19 disposed between the lining and platform 14. The adhesive may be conveniently heated by an electrical resistance wire 20 permanently embedded in lining 18 near its bonding surface. During the bonding process wire 20 is connected to a suitable source of electric current 22 by conductors 24 and 26. After the bonding operation, conductors 24 and 26 are cut off from wire 20 leaving the body of wire 20 embedded within lining 18 to be subsequently used again, after the lining has been worn down, to reheat the adhesive and debond the remainder of the lining from the shoe by again connecting the wire 20 to a source of electric current to heat the adhesive to its rupture temperature after which the remainder of the worn lining can be easily removed.

With reference to FIGURES 2–7, a particularly novel feature of the invention resides in the provision of means to retain resistance wire 20 within lining 18 and means to provide available contacts for wire 20 by which it can be readily connected to a source of electric current. These contacts may take the form of end clips that also conveniently serve to secure the wire during the molding operation of the lining.

Figure 2:
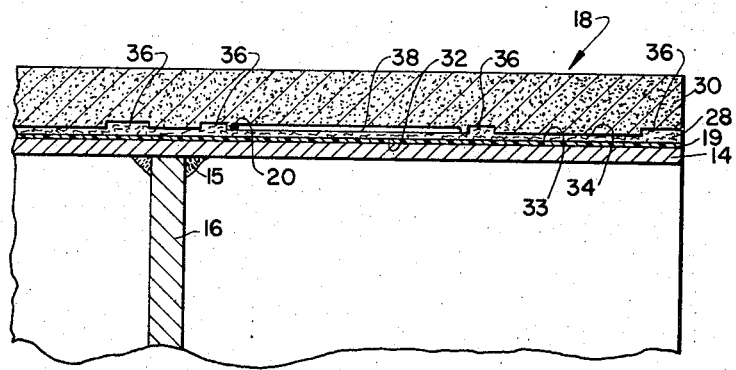
FIGURE 2 is an enlarged section on line 2—2 of FIGURE 1.

FIGURE 2 shows lining 18 as a composite assembly of a back-up member 28 of molded compressed material to which is cast-molded the outer main lining member 30 of conventional brake lining friction material.

Back-up member 28 may be molded or pressed, and is formed on an arc corresponding to the arc of the brake shoe table 14. The concave curved side 32 of back-up member 28 is attached to brake shoe platform 14. The convex curved side 34 of back-up member 28 is formed with a number of spaced longitudinal shallow ribs 36 for a purpose to appear. The height of the ribs 36 is preferably such as not to materially decrease to any great extend the effective thickness of the friction lining member 30.

Figure 7:
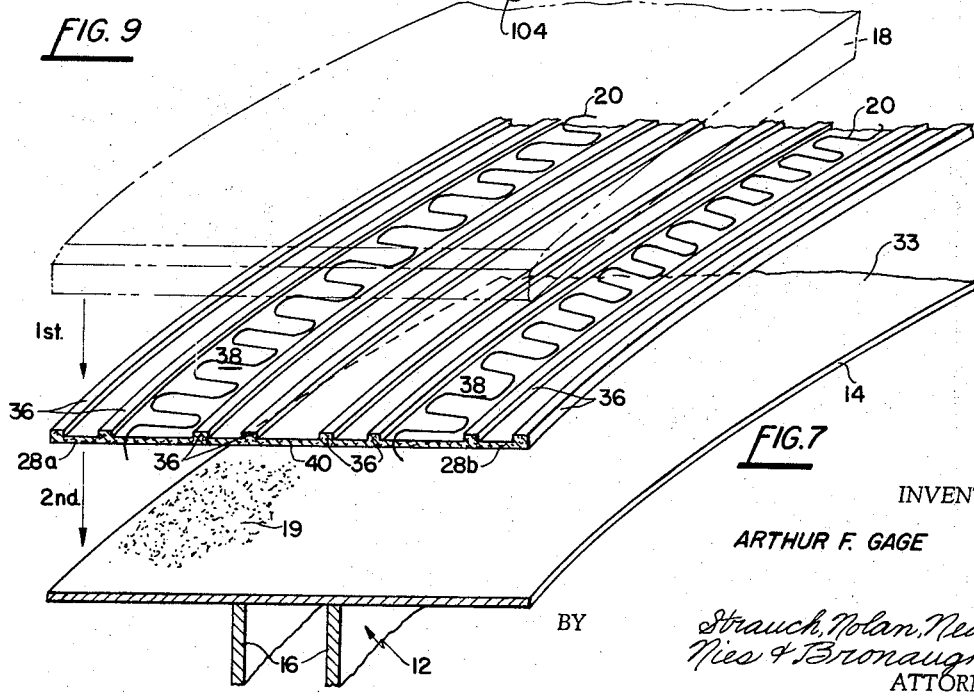
FIGURE 7 is a diagrammatic exploded view showing a metal brake shoe platform, a lining back-up member to which the resistance wire is attached and—in phantom lines—the lining shown in the order of their assembly.

In extra wide brake shoes it may be more practical to make the back-up member 28 in two parts, as in FIGURE 7. Back-up member parts 28a and 28b are generally identical, each comprising the same number of ribs and grooves except that they are arranged reversely to each other. In the assembly when molding the high friction lining material to the back-up member in the method to be described both parts will be placed adjacent to each other with their inner ends overlapping each other at 40. By making back-up member 28 in two parts in large width brake shoes, their handling is facilitated and danger of breakage of the back-up member which has a relatively thin wall thickness between the ribs will be greatly minimized. However, whether the back-up member is made in two parts or one is immaterial in the present invention.

Figure 3:
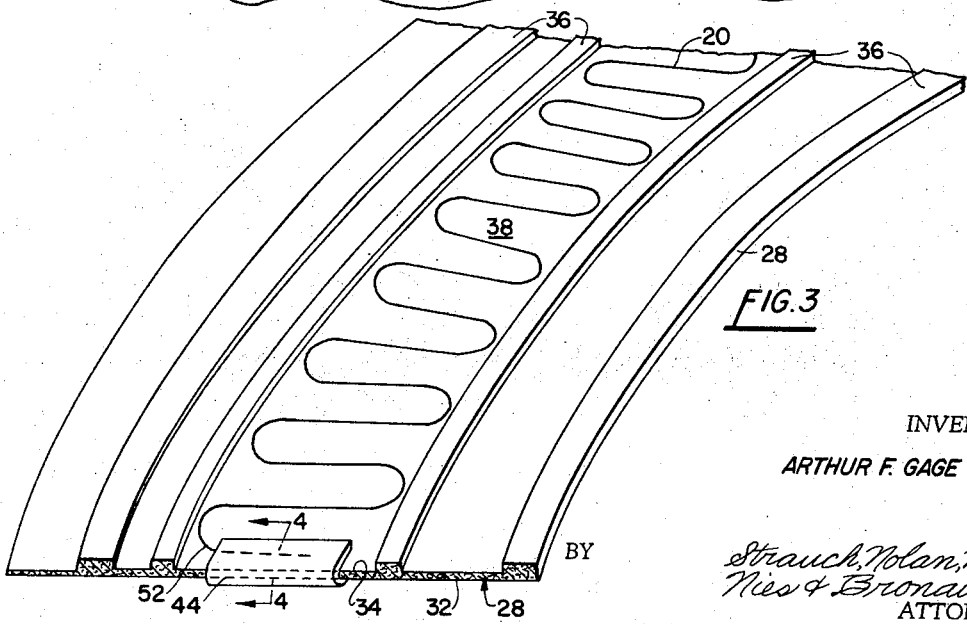
FIGURE 3 is a generally perspective view of part of the back-up member of the lining illustrating mounting of the resistance wire.

Electrical resistance wire heating element 20 is placed in groove 38 between two adjacent ribs 36. In FIGURE 3 this groove 38 is centrally located, and occupies about one-third or more of the width of the lining and wire 20 is sinuously distributed for wide area heat distribution. Wire element 20 may be conveniently a thin (preferably between approximately 20 to 30 gauge) sinuously looped, flat wire strip of appropriate width (preferably between 1 to 1½ inches) to substantially laterally occupy the groove 38. In wide brake shoe linings more than one resistance wire element may be used as shown in FIGURE 7 where two such wire elements 20 are shown, one each placed in a groove 38 of the back-up members 28a and 28b and extending longitudinally parallel in the assembly. The number of such longitudinal wire elements used may depend on the width of the brake shoe lining and the amount of heat necessary to quickly and effectively heat the bonding material.

A designated number of a pair or pairs of ribs 36 on the back-up member 28 are spaced apart to a width corresponding to the width of the sinuous wire strip element 20, that is, aprproximately 1 to 1½ inches, to hold the wire element or elements 20 in place during molding of friction lining 30 to the back-up member. The remaining ribs may be spaced more or less apart depending on the width of the brake shoe and all the ribs in conjunction with the grooves provide a secure interlock between the friction lining 30 and the back-up member 28 after they have been molded together.

The loops of the sinuous wire element 20 are preferably spaced approximately ⅛ to ⁵⁄₁₆ of an inch apart longitudinally which in practice proved to be sufficient for effective heating for normal brake shoe lining bonding.

The above disclosed wire parameters, of course, vary with the size and width of the brake shoe lining within the given ranges and other factors.

Figure 4:
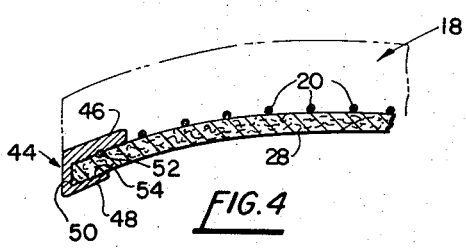
FIGURE 4 is an enlarged fragmentary section showing the wire fastening means substantially along line 4—4 of FIGURE 3.

To retain wire element 20 along its groove 38 a clip 44 of conductive material such as bendable metal may be used at each end. Such a clip is shown in FIGURES 3 and 4. Clip 44 may comprise a channel shaped member of steel of appropriate width, having an upper flange 46 and a parallel lower flange 48 spaced therefrom a distance substantially equal to the thickness of back-up member 28 and connected to the upper flange by a web 50. In assembly clip 44 is inserted over the end edge of groove 38 so that upper flange 46 overlies terminal 52 of wire element 20, and the lower flange 48 extends underneath the concave side 32 of the back-up member 28 with web 50 abutting the end edge of the back-up member. The inner surfaces of clip flanges 46 and 48 are serrated or otherwise roughened at 54 so that when clip 44 is in place and flanges 46 and 48 are squeezed toward each other by an appropriate tool these roughened clip surfaces bite into the relatively soft surfaces of back-up member 28 to thus securely anchor the end 52 of wire element 20 to the back-up member 28, and at the same time clip 44 is conductively connected to wire 20. It will be understood that another clip 44 is similarly used to attach the other end of wire element 20 at the other end edge of the groove 38 at the other end of the brake shoe.

Figure 5:
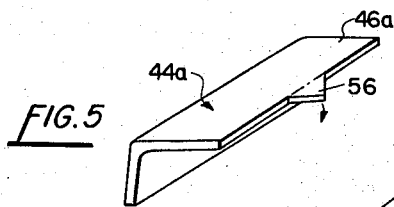
FIGURES 5 and 6 show optional wire fastening clips that may be used in the present invention.

FIGURE 5 illustrates an alternate form of clip 44a which is provided with only an upper flange 46a having a centrally located pointed tang 56 instead of a roughened inner surface, and this tang 56 is adapted in assembly to be bent down and pressed into the material of the back-up member 28.

Figure 6:
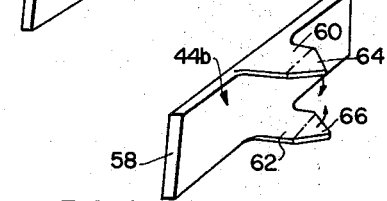

A still further embodiment of a clip 44b is illustrated in FIGURE 6 which is composed mainly of a web 58 adapted to lay flat against the end edge of back-up member 28, and from which web extends centrally located upper and lower sharp tangs 60 and 62 having pointed tips 64 and 66 respectively which are adapted to be bent toward each other in assembly to pierce into back-up member 28 to secure the clip in place and make contact with the end of wire 20.

Various other shapes of clips may be provided, the embodiments shown in FIGURES 3 to 6 serving as illustrations.

Figure 8:
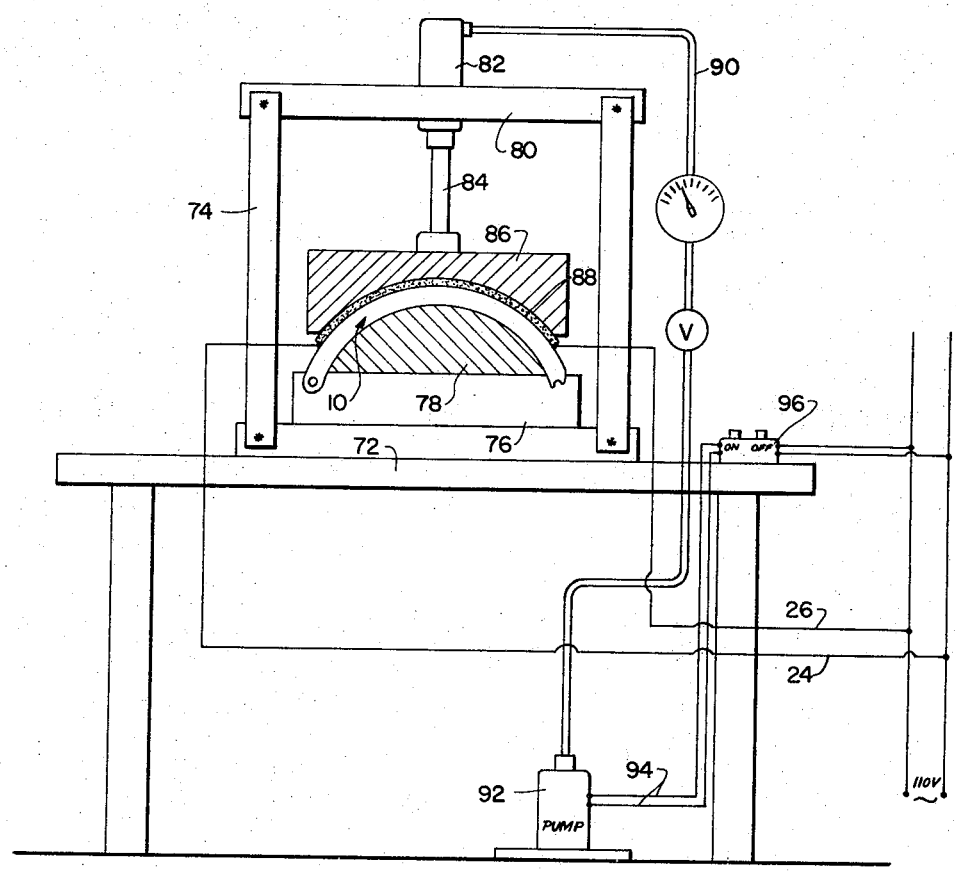
FIGURE 8 is a diagrammatic illustration showing one form of apparatus wherein the method of the invention may be executed.

After conductive clips 44 have been anchored to the backing member ends wire element 20 in its groove 38, back-up member 28 is placed in a mold (not shown) and the main friction lining member 30 is molded in place over the grooved convex side of the back-up member 28 as shown diagrammatically in FIGURE 8. The molding of friction brake lining 30 to back-up member 28 can be done in any conventional fashion and need not further be described. During pressure molding of lining 30 to back-up member 28 the material of the lining is pressed into grooves 38 and also around and between the loops of wire element 20 in the back-up member 28 as seen in FIGURE 2. Thus, when lining material 30 has cured to its operative condition, it forms a secure interlock with back-up member 28. The wire element or elements 20 in the groove or grooves 38 together with the upper part of conductive clip 44 extending over surface 34 will then be securely locked in place and permanently embedded by the interlock between lining 30 and back-up member 28.

After the lining 30 and back-up member 28 have been unitarily assembled by molding, the concave underside 32 of back-up member 28 is ground smooth to conform to the smooth platform surface 33. This also grinds away the lower flange 48 of conductive clip 44 completely, leaving only web 50 of the clip exposed at the end edge at each end of the shoe. Underside 32 is ground as smooth as possible to provide a smooth surface for the ensuing surface bonding operation to the brake shoe platform 14. There may be as much material removed from the underside of the back-up member as may be practical without complete destruction, so as to leave a minimum wall thickness at the groove sections of the back-up member so that the heat from the wire elements 20 can easily and rapidly penetrate through the back-up member to the adhesive as will appear.

The concave under surface 32 of back-up member 28 or, if preferred, the upper surface 33 of the brake shoe support 14 may then be uniformly coated with a heat setting adhesive, such as any of the known and commercially available phenol-formaldehyde resins. The amount of solid adhesive applied will depend on the size of the lining to be bonded, but it will not usually be necessary to cover the entire bond area, since, when the adhesive is heated, it will spread itself over the entire interface between surfaces 32 and 33. In practice, a good ratio of area to adhesive has been found to be approximately 2:1, that is, only approximately half of the total bond area needs to be initially covered with solid adhesive. The back-up member and lining assembly is then mounted upon the brake shoe platform by applying pressure thereto and an electrical connection is established between each embedded wire element 20 and a source of electric current by attaching wire leads to the respective conductive clips 44 as by soldering. This electrical connection is schematically illustrated in FIGURE 1.

When an electric current flows through wire elements 20 the generated heat is immediately transferred through the thin wall sections of the low friction electrically nonconductive back-up member 28 to heat the thermo-plastic adhesive 19 sufficiently to become fluent to spread and thus, by application of pressure on shoe and lining members 12 and 18, bond the two members together. When the fluent adhesive has spread and become set the element 20 is de-energized and the bonding pressure released. After the bonding operation the wire leads can be easily removed from clips 44.

Figure 9:
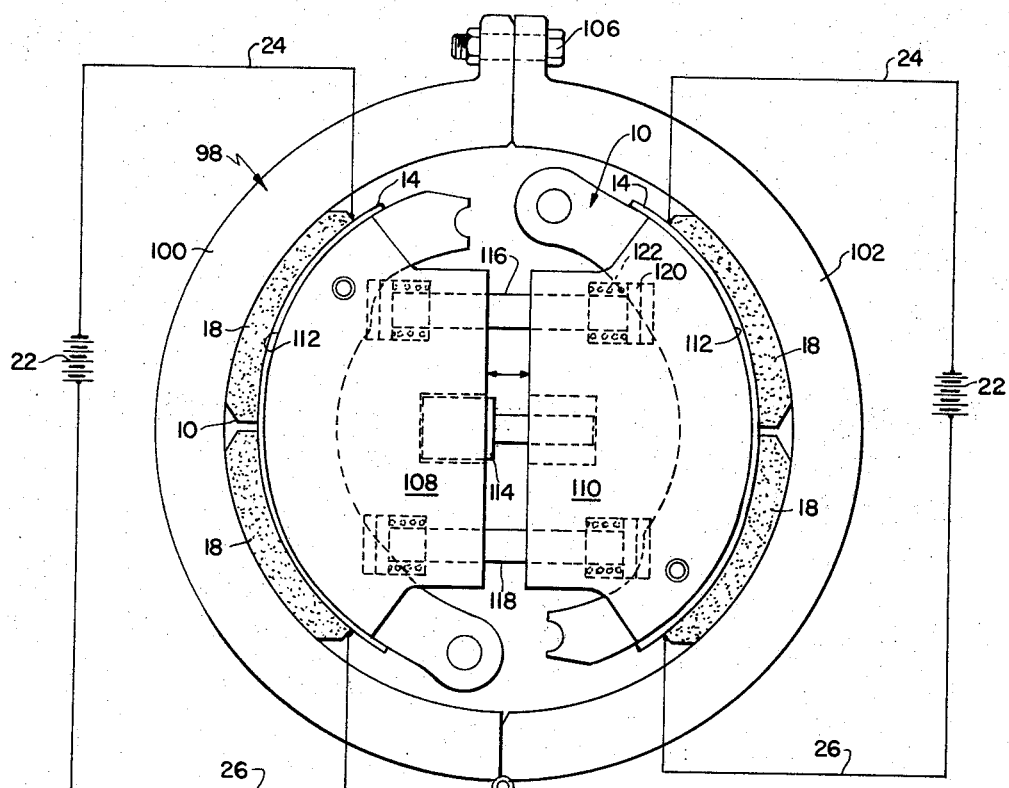
FIGURE 9 is another diagrammatic illustration showing another form of apparatus which may be used in the invention.
Figure 10:
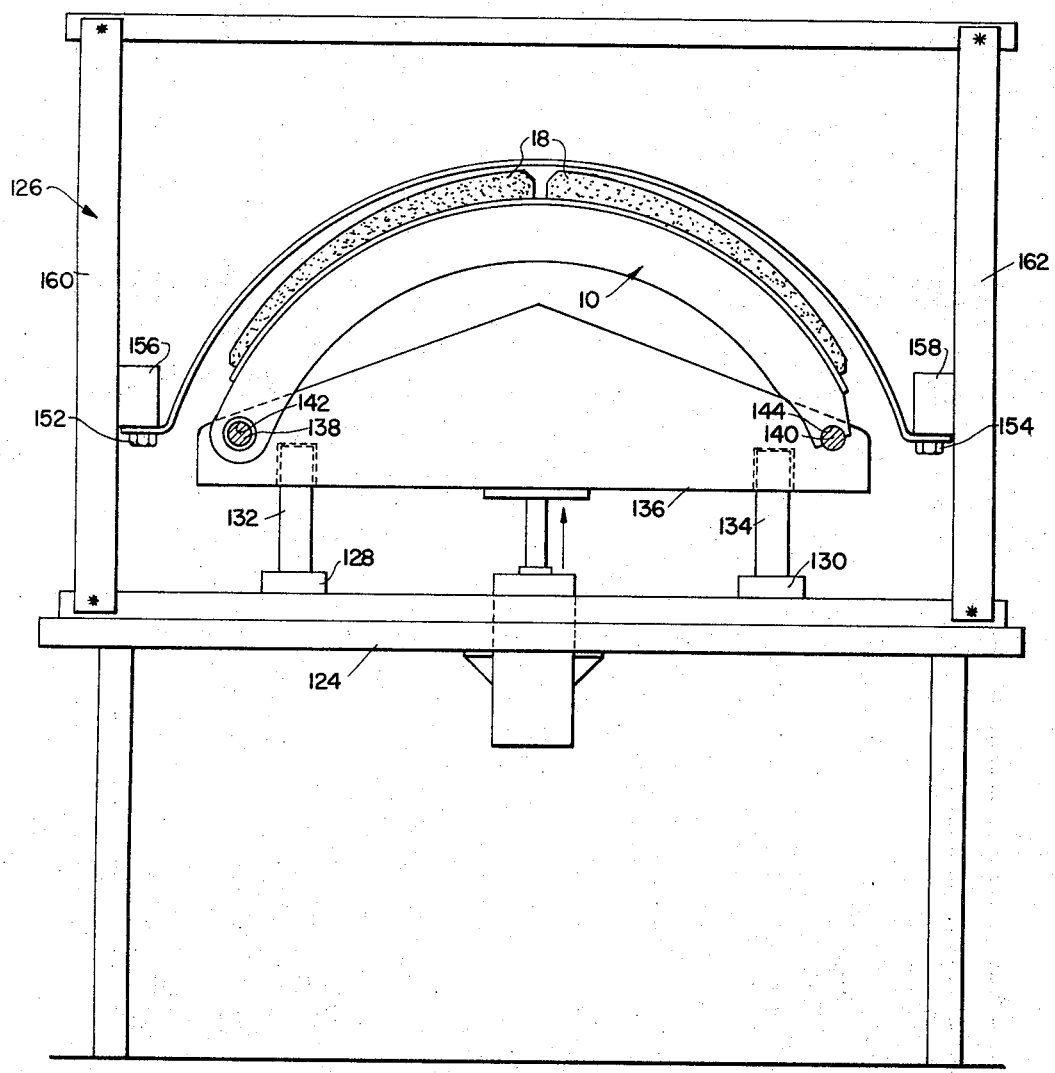
FIGURE 10 is still another diagrammatic illustration showing a further embodiment of a bonding apparatus which may be advantageously used in the invention.

FIGURES 8–10 illustrate diagrammatically exemplary apparatuses by which the method of the present invention may be carried out effectively, but the invention is by no means limited to these specific apparatuses since it will be obvious that various other arrangements may be employed to carry out the novel bonding method herein disclosed.

In FIGURE 8, the bonding apparatus 70 comprises a supporting table 72 mounting a frame work 74 that carries a lower stationary pressure plate 76 to which may be interchangeably attached an arcuate support 78 adapted to support the brake shoe assembly 10. Upper cross member 80 of frame work 74 supports a vertically oriented hydraulic cylinder 82 whose piston rod 84 carries a vertically movable pressure member 86 having a concave arcuate inner surface 88 corresponding to the shape of the brake shoe lining 18. Upper pressure member 86 is adapted when moved downwardly to exert uniform pressure on the brake shoe and lining assembly supported on stationary lower pressure member 76. To hydraulically move upper pressure member 86, cylinder 82 is connected by a conduit 90 to a hydraulic pump unit 92 which is electrically controlled by an off-on switch 96 to which the pump is connected by leads 94. As described the embedded wire elements 20 within lining 18 are connected by leads 24 and 26 to the source of electric current 22. After the heating circuit to wire 20 is closed and the "on" button of switch 96 is depressed, current will flow through the wire elements 20 embedded in the brake shoe lining and simultaneously pressure will be applied on the lining from the upper pressure member 86 for sufficient time to effect the bonding operation. After the wire 20 has been de-energized and the adhesive sets, the brake shoe assembly is released from apparatus 70.

FIGURE 9 is a top plan view of a bonding apparatus by which two brake shoes may be processed simultaneously.

The apparatus is positioned horizontally and comprises a ring member 98 which may be conveniently made in two pieces 100 and 102 hinged together at 104 and releasably clamped at the other end as by bolt and nut assemblies 106 to allow the two halves to be swung apart for easy insertion and removal of the work pieces.

Ring member 98 is placed on a suitable support (not shown) and contains two identical oppositely positioned expanding tools 108 and 110 which have arcuate surfaces 112 engaging the undersides of brake shoe platform 14 of two brake shoe and lining assemblies 10 placed in opposite reversed position within ring 98. Tools 108 and 110 are displaced oppositely outwardly towards surrounding ring member 98 by a centrally positioned free floating hydraulic cylinder unit 114 which expands in both directions when actuated. Tools 108 and 110 are aligned and centralized in relation to ring 98 by means of parallel pins 116 and 118 positioned on opposite sides of the cylinder 114. During longitudinal expansion of cylinder 114, pins 116 and 118 remain stationary, and they are equipped with flanges 120 at their ends adapted to compress springs 122 contained within the tools 108 and 110 that provide the return force for the tools when the pressure in hydraulic cylinder 114 is released.

The embedded wire elements 20 in the brake shoe and lining assemblies 10 are likewise connected by leads 24 and 26 to sources of electric current 22 and it will be understood that suitable controls (not shown) for the actuation of the apparatus are provided to actuate the hydraulic cylinder 114 to press the brake shoes 10 against the inner face of ring member 98 and at the same time apply electric current to the embedded heating wire elements in the brake shoe linings for the bonding operation as above described.

FIGURE 10 illustrates still another bonding apparatus comprising a work support 124 carrying frame 126.

Attached to the top of the work support within the confines of frame 126 are brackets 128 and 130 which carry studs 132 and 134 extending into sockets in a lower pressure member 136 to rigidly support and align member 136. Member 136 carries at its outer end pins 138 and 140 respectively adapted to hold and support in upright position a brake shoe 10 by extension of pin 138 through the usual anchor hole 142 of the brake shoe at one end and by extension of the other pin 140 through the usual cam roller recess 144 at the other end of the brake shoe. The brake shoe is thereby supported with the lining 18 facing upwards.

Lower pressure member 136 is adapted to be moved vertically up and down guided by studs 132 and 134 against tilting. To this end a vertical hydraulic cylinder 146 is attached to work support 124 and piston rod 148 abuts against or is attached to the underside of pressure member 136 so that upon energization of cylinder 146 lower pressure member 136 with the brake shoe 10 carried thereon will be moved upward and upon release of pressure it will move downward again.

Spanned across the frame 126 above brake shoe 10 is an arched flexible band of steel 150 constituting an upper pressure member which is rigidly attached at both its ends 152 and 154 at the same level to the frame by brackets 156 and 158 respectively on columns 160 and 162. The arch of the steel band 150 is substantially correspondent to the arch of the brake lining 18.

When lower pressure member 136 is raised by hydraulic cylinder 146, which as will be understood is equipped with suitable controls and hydraulic connections (not shown), brake shoe lining 18 will be pressed against steel band 150 during the bonding operation described earlier. Steel band 150 is of such strength as to withstand the pressure exerted by the hydraulic cylinder 146 and moreover flexible enough to smoothly conform to the shape of the lining so that by this arrangement pressure is quite evenly distributed across the area of the lining. Furthermore, due to the flexibility of the steel band internal crushing forces set-up in the brake shoe during the pressing operation are greatly reduced.

It will be understood that electrical contact with ends of the heating wire element within lining 18 for heating the adhesive will be established in a manner analogous to that shown in FIGURE 8 and need not be repeated here.

Also the solid pressure ring in the FIGURE 9 embodiment may be replaced by a flexible steel band of equal strength similarly to the arrangement in FIGURE 10.

Thus the present invention provides effective and novel apparatus to secure and retain the resistance wire element within a composite brake shoe lining in such way that rapid efficient heating of a thermoplastic adhesive placed adjacent one surface of the lining is possible without waste of current or transfer of excessive heat into the metal body of the brake shoe.

The invention provides a novel brake lining unit consisting essentially of coextensive back-up and friction lining members unitarily secured together as by molding and containing between them the longitudinally extending heating element 20 having fixed terminals such as clips 44 at the opposite end edges of the lining. The lining 18 always comprises a longitudinally continuous back-up member, which may be laterally two-piece, as in FIGURE 7; and the friction material may be in a continuous block, or two or more longitudinally spaced blocks (for heavy duty brakes) as in FIGURES 9 and 10. The back-up member is preferably of a non-electrically conductive material such as asbestos, mica or like compositions and preferably softer than the friction material 30, which latter is standard brake lining friction material. In general, except for its modification to the invention the back-up member may be of the type and material disclosed in U.S. Letters Patent No. 2,272,532. The back-up member is as thin as possible for rapid and efficient transmission of heat to the adhesive during bonding and debonding, but it must be strong enough to provide a unitary heating element retaining layer on the friction material.

By disposing the heating wire within the back-up member grooves an entirely new and advantageous structure is provided. Where the wire was mounted in recesses in the friction material as has been proposed, it was difficult to retain the wire there during the preparation for and the actual bonding operations, and this problem is entirely eliminated in the invention. Moreover, by providing the heating element between the back-up member and friction material in a groove in back-up member, the frictional material may be worn down to the back-up member without destroying the heating element, which latter remains available for the debonding operation.

The present invention may be embodied in other forms without departing from the essential characteristic and spirit thereof, therefore, the present embodiments are to be considered in all respects as illustrative only and not restrictive, the scope of the invention being indicated by the appended claims rather than by the foregoing description.

What is claimed is:

1. A composite brake lining of the type that is bonded by a heat setting adhesive to a metal brake shoe platform consisting essentially of an outer friction material member and a separate preformed internal solid back-up member molded together in assembly, an electrical heating element extending longitudinally between said members, and externally accessible terminals for said element at opposite ends of said lining.

2. A composite brake lining unit of the type that is bonded by a heat setting adhesive to a metal brake shoe platform comprising a solid back-up member an outer friction material member in the form of a body of friction material rigidly secured to said back-up member along its outer surface, means defining an internal recess between said members substantially along their coextensive length, a longitudinally extending electrical heating element mounted in said recess, and conductive terminals on said heating element adjacent the opposite ends of said back-up member.

3. The brake lining unit defined in claim 2, wherein said back-up member is provided with longitudinally extending ribs that define said heating element mounting recess between said members.

4. The brake lining unit defined in claim 2, wherein said terminals are conductive elements secured upon the ends of said back-up member and attached to opposite ends of said heating element.

5. The brake lining unit defined in claim 2, wherein said heating element is a sinuous flat wire strip disposed in said recess.

6. The brake lining unit defined in claim 2, wherein said friction material is combined in molded interlock with said back-up member.

7. The brake lining unit defined in claim 2, wherein said friction material is the usual hard material used for vehicle brake linings, and said back-up member is a relatively thin shell of electrically non-conductive material that conducts heat more readily than said body of friction material.

8. The brake lining unit defined in claim 2 wherein said back-up member is a relatively thin curved shell having its outer convex side formed with at least one pair of longitudinally extending ribs for molding interlock with said friction material and defining between them said longitudinal recess wherein said heating element is confined between the friction material and the back-up member.

9. The brake lining unit defined in claim 8, wherein said heating element is a resistance wire extending along said recess and said terminals are metal clips secured to said back-up member at opposite ends of said recess to anchor and make positive contact with opposite ends of said wire.

10. The brake lining unit defined in claim 9, wherein said friction material is permanently molded to said back-up member.

11. The brake lining unit defined in claim 8, wherein said back-up member has an inner concave surface smoothly ground to the contour of the brake shoe platform to which it is to be bonded.

12. The brake lining unit defined in claim 8, wherein said wire is substantially sinuously bent to extend as a relatively flat strip within said groove.

13. In combination with a brake shoe having a lining support surface, a composite lining bonded directly to said lining support surface by heat setting adhesive, said composite lining comprising an outer member of usual friction brake lining material rigidly molded to a separately preformed relatively thin solid electrically non-conductive back-up member bonded to the brake shoe support by said heat setting adhesive applied between said back-up member and said support, an electrical resistance element confined between said friction material member and said back-up member with exposed terminals adapted to be connected to a source of electric current at opposite ends, said resistance element being of such characteristics when voltage is applied thereto to supply sufficient heat for conduction through said back-up member to set said adhesive and bond the composite lining to the shoe.

14. In the combination defined in claim 13, said back-up member being provided with parallel longitudinal ridges along the surface facing said friction material member and said resistance element being positioned within the space between said ridges and thereby protected against damage when said friction member has become worn down to said back-up member.

15. A composite brake lining unit comprising a solid back-up member having a body of friction material secured thereto along its outer surface, means defining a longitudinal surface recess in said back-up member along its length, a longitudinally extending electrical heating element mounted in said recess, and conductive terminals on said heating element adjacent the opposite ends of said back-up member comprising metal clips securely fastened to opposite ends of said back-up member.

16. Friction brake means of the type wherein a brake lining unit is secured by a heat setting adhesive upon a rigid lining support, characterized by said unit comprising a relatively thin solid preformed back-up member having an inner surface for bonding to said support and a friction material member secured as by molding upon its outer surface, means providing an elongated recess extending between said members substantially adjacent and outwardly of said inner surface of the back-up member, an electrical resistance heating element mounted to extend along said recess, and conductive terminals on the ends of said element fixed to said back-up member and accessible externally of said friction material.

17. A brake lining unit comprising a relatively thin solid back-up member adapted to be bonded on its inner surface to a lining support and having a friction material member rigidly secured thereto along its outer surface, said back-up member's outer surface being formed with at least one pair of longitudinally extending ribs for molding interlock with said friction material and defining between them a shallow recess extending between said members, an electrical resistance heating element mounted to extend longitudinally within said recess, and exposed electrically conductive terminals for said element carried by said back-up member.

18. A brake lining unit comprising a back-up member having its inner surface adapted for adhesive bonding to a brake shoe and a body of friction material rigidly secured thereto along its outer surface, said back-up member being in the form of a relatively thin curved shell having its outer convex surface formed with at least one pair of longitudinally extending ribs for molding interlock with said friction material and defining between them a shallow longitudinally extending recess between said back-up member and said body of friction material, a longitudinally extending heating element disposed within said recess, and conductive terminals on said heating element adjacent the opposite ends of said back-up member.

References Cited

UNITED STATES PATENTS

| | | | |
|---|---|---|---|
| 1,972,439 | 9/1934 | Dresser | 156—275 X |
| 2,531,782 | 11/1950 | Moore | 188—234 |
| 2,742,390 | 4/1956 | Beck | 156—275 X |
| 2,781,107 | 2/1957 | Smith et al. | 188—251 |
| 3,049,465 | 8/1962 | Wilkins | 156—275 |

FOREIGN PATENTS 540,546    5/1957    Canada.

MILTON BUCHLER, *Primary Examiner.*

G. E. HALVOSA, *Assistant Examiner.*